(12) United States Patent
Bigolin

(10) Patent No.: US 8,720,992 B2
(45) Date of Patent: May 13, 2014

(54) ERGONOMIC SADDLE STRUCTURE

(75) Inventor: Giuseppe Bigolin, Rossano Veneto (IT)

(73) Assignee: Selle Italia S.R.L., Casella d'Asolo (TV) (IT)

( * ) Notice: Subject to any disclaimer, the term of this patent is extended or adjusted under 35 U.S.C. 154(b) by 0 days.

(21) Appl. No.: 13/811,202

(22) PCT Filed: May 16, 2011

(86) PCT No.: PCT/IB2011/052139
§ 371 (c)(1),
(2), (4) Date: Jan. 18, 2003

(87) PCT Pub. No.: WO2012/010988
PCT Pub. Date: Jan. 26, 2012

(65) Prior Publication Data
US 2013/0127214 A1    May 23, 2013

(30) Foreign Application Priority Data

Jul. 22, 2010   (IT) .............................. VI2010A0202

(51) Int. Cl.
    *B62J 1/00*          (2006.01)
(52) U.S. Cl.
    USPC .................................. 297/195.1; 297/215.14
(58) Field of Classification Search
    USPC ............................. 297/195.1, 215.14, 215.16
    See application file for complete search history.

(56) References Cited

U.S. PATENT DOCUMENTS

| | | | | |
|---|---|---|---|---|
| 91,062 | A | * | 6/1869 | Ambler ...................... 297/195.1 |
| 672,193 | A | * | 4/1901 | McKinlay ...................... 264/222 |
| 4,369,998 | A | * | 1/1983 | Blase ........................ 297/215.16 |
| 6,957,857 | B1 | | 10/2005 | Lee |
| 2006/0255631 | A1 | | 11/2006 | Ljubich |
| 2007/0182225 | A1 | * | 8/2007 | Bigolin ..................... 297/215.13 |
| 2007/0210624 | A1 | * | 9/2007 | Chen et al. ................. 297/195.1 |

FOREIGN PATENT DOCUMENTS

GB                426657             4/1935

* cited by examiner

*Primary Examiner* — Milton Nelson, Jr.

(57) ABSTRACT

An ergonomic saddle structure for bicycles and pedal machines, includes a shell made of relatively rigid material, and a connection member anchoring the shell to a frame of a bicycle or a pedal machine. The shell has a rear portion of enlarged plan shape and, a front portion with at least partially tapered plan shape, and an intermediate connection portion. The rear portion has uniformly joined lateral edges of a substantially convex shape. The intermediate portion has lateral edges of concave plan form and bend radius about equal to the average bend radius of the lateral edges of the convex rear portion (3), and a minimum width just greater than the maximum width of the connection member, so to define, at the user's thighs, a narrow zone adapted to reduce compression and rubbing of the inner surface of the thighs with the lateral edges of the shell.

13 Claims, 3 Drawing Sheets

ERGONOMIC SADDLE STRUCTURE

TECHNICAL FIELD

The present finding is generally applicable in the technical field of supports for the human body and in particular has as object an improved ergonomic saddle structure, especially for bicycles and pedal operated machines.

BACKGROUND THE ART

It is known that the saddles used in pedal vehicles, such as bicycles but also exercise bikes or wheel trainers for sports training, are formed by a shell made of a relatively rigid material, preferably covered by a relatively yielding padding layer that is intended to come into contact with the body of the user.

Generally, the shell comprises a rear portion intended to support the pelvis bones, in particular the ischial tuberosity and the surrounding muscular tissues, and a front portion intended to support the inguinal or scrotal zone of the user.

Typically, the rear portion is relatively enlarged and has a sufficient width for offering a relatively comfortable sitting, while the front zone must have a smaller width for allowing the user to extend the legs in a substantially vertical direction in order to carry out the pedal stroke.

One drawback of this saddle type is that the front portion of the saddle, even if tapered with respect to the rear portion, is in any case wide enough to oblige the user to rotate the knees outward, in order to avoid rubbing the thighs against the lateral edges of the saddle.

This phenomenon is even more evident when the users have very developed musculature and above all a thigh circumference that is relatively high with respect to the width of the pelvis. Comparative ergonomic studies conducted on different subjects have allowed verifying that users with a thigh circumference—pelvis width ratio above a certain value sustain rubbing between the inner thigh and the edge of the saddle, and a significant mechanical impediment to the correct extension of the thigh during the pedal stroke, in addition to high compressions of the adductor muscles.

From a functional standpoint, the user has a hard time completely extending the lower limb up to an approximately 145° angle with respect to the articulation of the knee and thus is obliged to rotate all of the articulations of the lower limb in an irregular manner, i.e. the femur, the knee and the ankle, proceeding with the classic pedal stroke with spread knees.

In order to avoid or reduce the aforesaid phenomena, users instinctively employ to different strategies: the first consisting of moving forward on the saddle, which can confer a greater pedal stroke freedom but also negative consequences for the comfort or the increase of perineal pain; the second consisting of lowering the saddle in a manner such that the leg does not extend in the final 10-15° of rotation, which bring the angle between the thigh and the leg from 130 to 145° extension.

In order to systematically study the phenomenon, a study was conducted on a sample of users of different size, weight and sex in order to obtain the value of the compression of the inner part of the thigh during the pedal stroke on the lateral edge of the saddle during the final 20° of movement before reaching the lower dead center. It was found that the pressure exerted in such zone can be quantified in 1 N/cm2, equal to about 10 kPa.

Assuming that this pressure is exerted on a surface area of about 4 cm2, it can be deemed that it determines an increase of the mechanical work, not useful for advancing, of about 70 Watt (about 1 Km/h from 39 to 40 km/h).

This increased mechanical work exerted by the muscles, which in this step are very contracted, alters the heart rate of the cyclist, increasing his physical overload. This situation can be compared to the case in which a car proceeds with the brake constantly on.

For a long time, there has been the need to obtain an ergonomic saddle structure that fully solves all these problems, decisively improving the functionality and the comfort for users at a very limited cost.

Saddles structures are known with a tapered front portion and an enlarged rear portion with convex edges, mutually joined by an intermediate portion with concave lateral edges, see for example US 2005/0017552, DE19901932 and U.S. Pat. No. 6,039,395.

However, these known saddle structures are mainly directed to improve the comfort in the ischiatic abutment zone and do not propose reducing the friction along the inner part of the thighs. Indeed, they have an intermediate connection portion between the front and rear portion which has lateral edges with excessive bend radius variation, on one hand limiting the abutment zone in proximity to the ischiatic bones and on the other hand exerting excessive friction until the movement of the thigh in the rear part of the saddle is blocked.

From FR 2451310, a connection device between the saddle and a seat post is known; such device has a predetermined width that is never associated with the minimum width of the saddle with which the device is connected.

US2006/0255631 discloses a saddle having all the features of the preamble of claim 1. However, this saddle has an enlarged rear portion substantially square-shaped which does not confer a comfortable stroke on the pedal.

DISCLOSURE OF THE INVENTION

The main object of the present finding is to overcome or at least limit the drawbacks outlined above, by obtaining an improved ergonomic saddle structure which has high functionality and comfort characteristics in a simple and economical manner.

One particular object is to provide a saddle structure with an ergonomic design that allows avoiding the phenomena of sliding friction and compression between the inner thigh and the edge of the saddle.

A further object is to provide a saddle structure which allows avoiding irregular functional dynamics that negatively affect the comfort and health of users.

Still another object is to conceive an improved saddle structure which allows reducing the transverse bulk at the user's thighs to a minimum.

Such objects, as well as others which will be clearer below, are achieved by an improved ergonomic saddle structure, particularly for bicycles and pedal operated machines having the characteristics stated in claim 1.

In particular, the saddle structure according to the finding comprises a shell made of a relatively rigid material having a longitudinal axis and a specific total length, connection means designed to anchor the shell to a frame of a bicycle or a pedal operated machine, wherein such means have a given predetermined maximum width.

The shell comprises a rear portion with enlarged plan shape and predetermined maximum total width, a front portion with substantially tapered plan shape, and an intermediate connection portion, wherein said rear portion has uniformly joined lateral edges of convex shape.

The structure is characterized in that the convex lateral edges of the rear portion have a substantially constant curvature and a predetermined average bend radius, and in that the intermediate portion has a minimum width just greater than the maximum width of the connection means.

In addition, the lateral edges of the intermediate portion have a minimum bend radius about equal to the average bend radius of the rear portion and centers of curvature placed at a distance from the front end edge about equal to the distance of said minimum width of the intermediate portion from the front edge.

Due to such configuration, the shell has, at the user's thighs, a narrow zone adapted to eliminate or at least considerably reduce the compression and the rubbing of the inner surface of the thighs with respect to the lateral edges, increasing the comfort and the efficiency of the pedal stroke.

Preferably, the minimum bend radius of the lateral edges of the intermediate portion is comprised between 20% and 50% of the total length of the shell and is preferably about 30% of said total length.

Suitably, the minimum width of the intermediate portion is comprised between 20% and 30% of the maximum total width and is preferably about 25% of such total width. Such minimum width is positioned at a distance from the front end of the shell comprised between 30% and 50% of the total length.

In addition, the center of curvature of the lateral edges of the intermediate portion is positioned at a distance from the front end of the shell about equal to the distance of said maximum total width from the front end of the shell.

In a further aspect of the finding, the connection means comprise a fork connection that can be coupled to the lower part of said shell and is provided with a longitudinal through slit having substantially flared edges.

The connection means also comprise a connection fork having a pair of lateral wings with a minimum distance corresponding to the maximum width of said extended member, said lateral wings having respective circular through openings adapted to receive locking means of the fork with respect to the bayonet connection.

BRIEF DESCRIPTION OF THE DRAWINGS

Further features and advantages of the finding will appear more clearly in light of the detailed description of a preferred but not exclusive embodiment of an ergonomic saddle structure, illustrated as a non-limiting example with the aid of the enclosed drawing tables, in which.

DETAILED DESCRIPTION OF A PREFERRED EMBODIMENT

Figure 1:
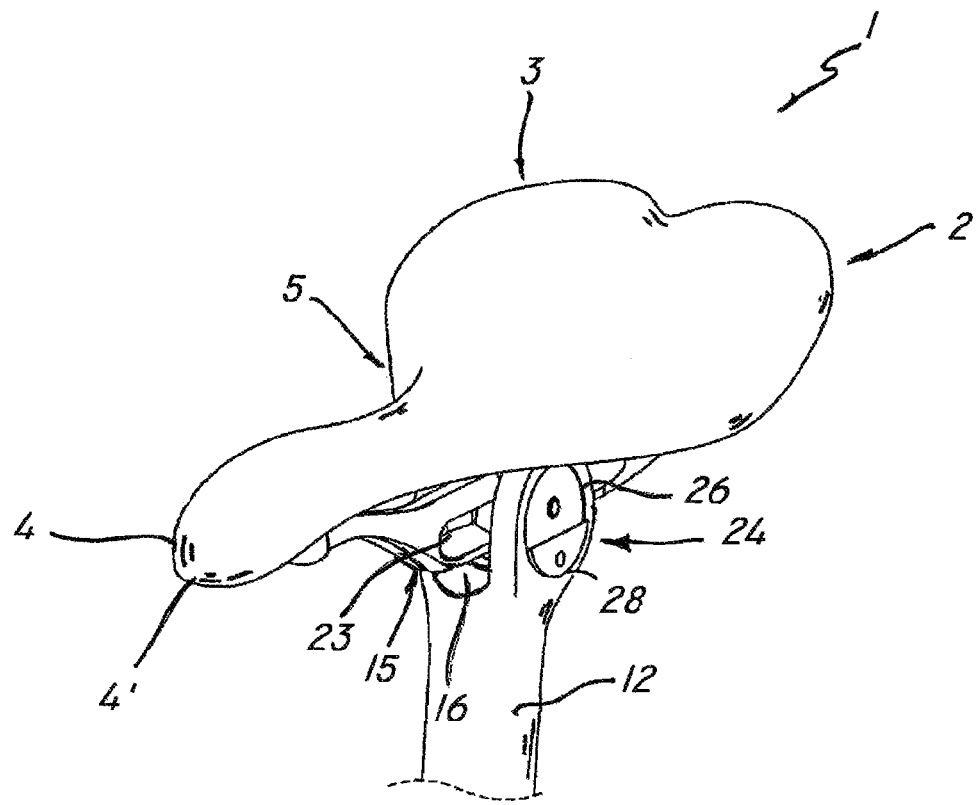
FIG. 1 is a top perspective view of a saddle structure according to the finding mounted on a tubular seat post.

With reference to the mentioned figures, the ergonomic saddle structure according to the finding, indicated with the reference number 1 in its entirety, can be anchored to a frame of a bicycle or a pedal machine, such as for example an exercise machine or a stationary roller for outdoor and indoor bike training.

The saddle structure 1 essentially comprises a shell 2 made of a relatively rigid material, such as wood, metal, a thermosetting or thermoplastic polymer resin, of epoxy, polyamide or polypropylene type, fairly loaded with particles or reinforced with fibers, having a longitudinal axis X passing through a substantially vertical plane of symmetry V and a total length L.

The shell 2 comprises an enlarged rear portion 3, intended to support the lower ends of the ischial bones, having a predetermined maximum width W, and a tapered front portion 4 intended to support the pubic or scrotal zones of the user's body, having a rounded front edge 4' with end A.

The aforesaid rear 3 and front 4 portions are joined together in a continuous manner by an intermediate portion 5.

More in detail, the shell 2 has lateral edges, substantially symmetric with respect to the longitudinal axis X and to the plane of symmetry V, which are also uniformly joined along the entire longitudinal extension.

In particular, it is observed that the rear portion 3 has lateral edges 6, 7 having convex plan shape and the front portion 4 has lateral edges 9, 10 at least partially parallel and also convex.

Below, with the term "lateral edge", it is intended the portion of the edge of the shell 2 which is extended from the front end A up to the rear end points P and P' in which the tangent to the profile is substantially perpendicular to the longitudinal axis X, therefore excluding the rear concave portion interposed between the points P and P'.

The shell 2 is removably mounted, by means of suitable connection means generically indicated with 11 (more clearly visible in FIGS. 5 and 6 and which will be described in more detail below), to a frame of a bicycle or similar machine, in particular to a seat post 12 insertable in an upright of the aforesaid frame and preferably height-adjustable by means of a clamp or another locking member not shown in the figures.

Figure 5:
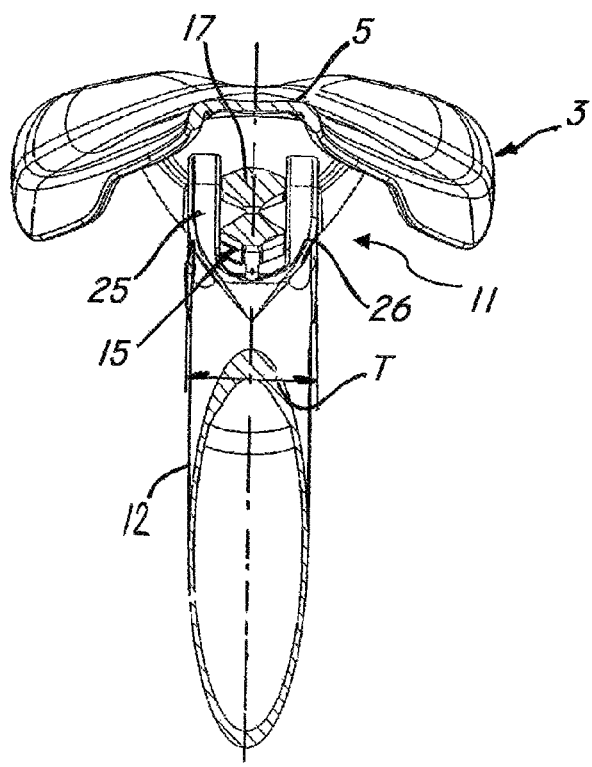
FIG. 5 is a section view of the saddle of FIG. 4 taken along the trace plane V-V.

It is also observed that the connection means 11 have a total width T, as better shown in FIG. 5, in proximity to the connection zone with the shell 2.

According to the finding, the convex lateral edges 6, 7 of the rear portion 3 have substantially constant bend radius with average value M, while the lateral edges 13, 14 of the intermediate portion 5 are concave and uniformly joined to the convex lateral edges 6, 7 of the rear portion 3 and to the convex lateral edges 9, 10 of the front portion 4.

Figure 3:
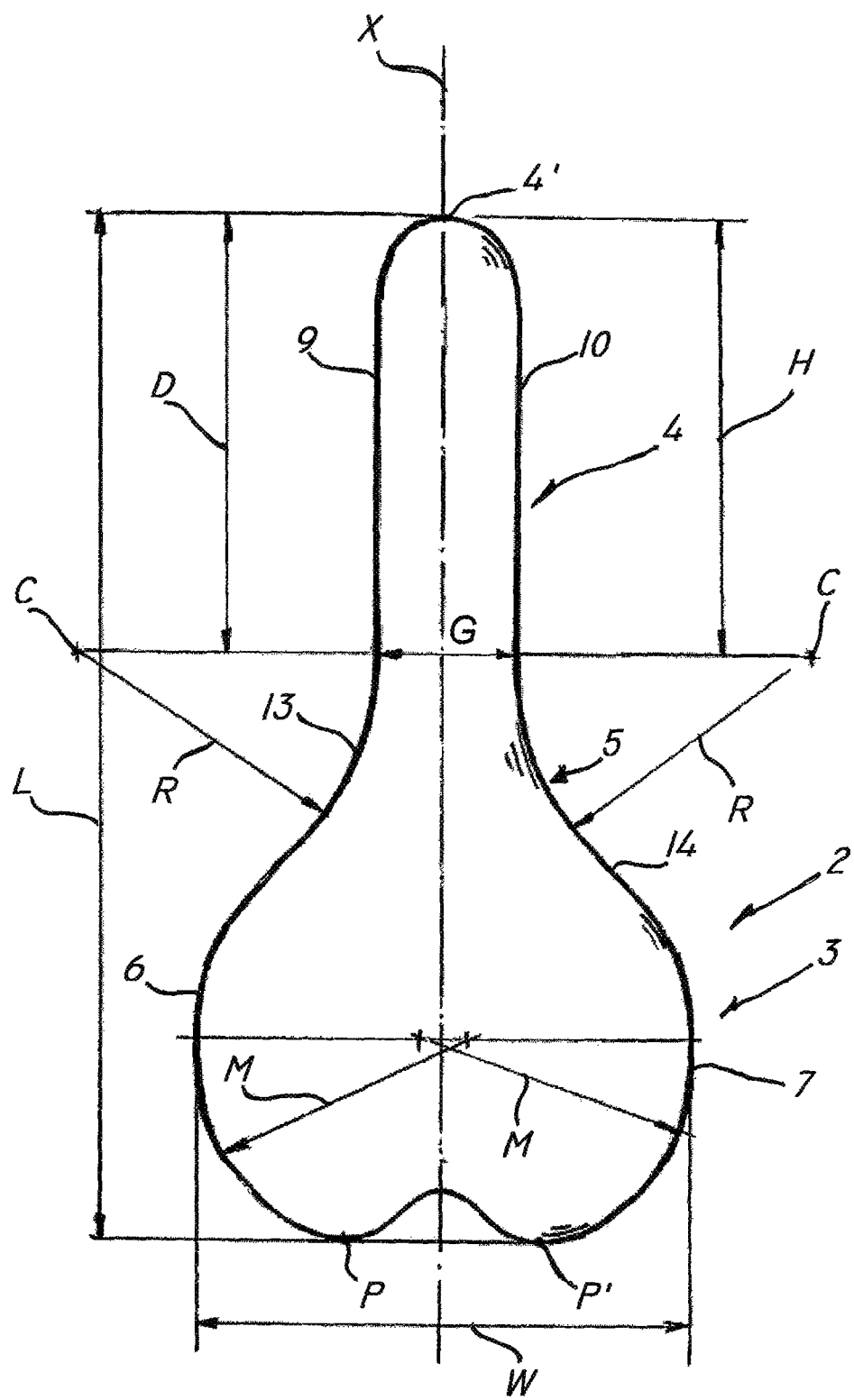
FIG. 3 is a plan view of the saddle structure of FIG. 1.

One particular aspect of the invention consists of the fact that the lateral edges 13, 14 of the intermediate portion 5, clearly illustrated in FIG. 3, have in plan view a bend radius R about equal to the average bend radius M of the lateral edges 6, 7 of the rear portion 3.

In addition, the intermediate portion 5 has a minimum width G just greater than the maximum width T of the connection means 11, in a manner so as to define at the user's thighs a narrow zone generically indicated with S, adapted to reduce the compression and the rubbing of the inner thigh with respect to the aforesaid lateral edges 13, 14, increasing the comfort and efficiency of the pedal stroke.

Below, several preferred but not exclusive values will be provided of ratios between the main dimensions of the shell 2, constituted by the total length L and by the maximum width W, which were determined on the basis of statistical data and confirmed by experimental results.

From tests and experimental trials, it was ascertained that an optimal value of the minimum bend radius R is comprised between 20% and 50% of the total length L of the shell 2. Preferably, such bend radius R will be about 30% of said total length L.

It was also verified that an optimal value of the minimum width G of the intermediate portion 5 is preferably comprised between 20% and 30% of the maximum width W and still more preferably about 25% of such maximum width W.

It is also verified that an optimal distance D of the width G from the front edge 4', substantially about equal to the distance H of the centers of curvature C from the same front edge 4', is comprised between 30% and 50% of the total length L, preferably about 40% of such total length L.

For example, with a shell 2 having a total length L of about 270 mm, and a maximum width W of about 120 mm, the bend radius R will preferably be comprised close to 90 mm, the maximum width G will be about equal to 35 mm and their distance from the end 4' will preferably be equal to 90 mm.

This overall configuration of the shell allows obtaining a significant reduction of the plan surface area and that of the rubbing zone with the user's body, with consequent reduction of the compression and friction forces between said lateral edges and the inner surface of the user's thigh, with corresponding increase of the comfort and efficiency of the pedal stroke.

In this configuration, the configuration of the connection means 11 plays a significant role; such means must have suitably reduced bulk, e.g. of the type described in the patent EP 1 816 060 in the name of the same Applicant, although they could have any shape, even substantially different shape, without at all modifying the protective scope of the invention.

As specifically shown in FIGS. 1, 2, 4, 5, the connection means 11 comprise a suitably shaped pronged connection 15 that can be coupled to the shell 2, as will be more clearly described below.

Figure 2:
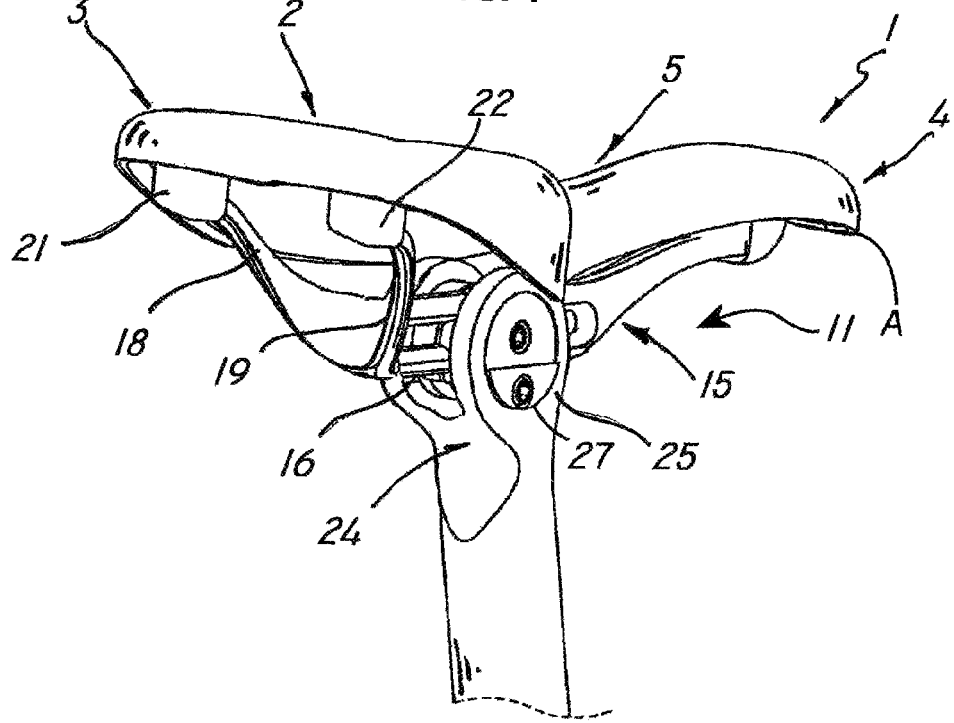
FIG. 2 is a bottom perspective view of the saddle structure of FIG. 1.
Figure 4:
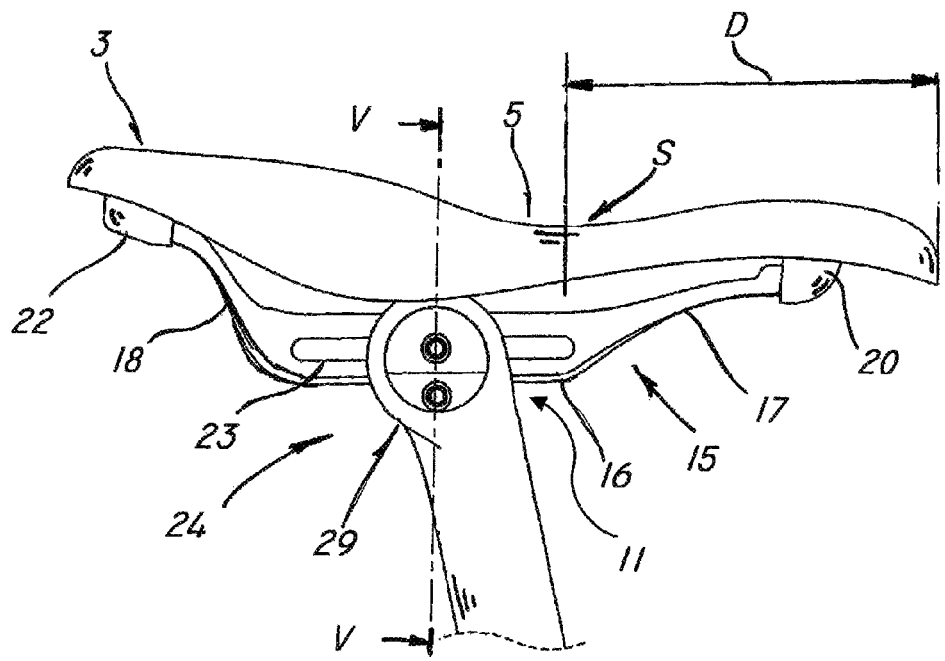
FIG. 4 is a side view of the saddle of FIG. 1.

More specifically, the pronged connection 15 has a substantially rectilinear central body 16 having a front prong 17 and a pair of substantially symmetric rear prongs 18, 19 directed upward with respect to the central body 16, clearly visible in FIGS. 2 and 4.

The prongs 17, 18, 19 are insertable in respective housings 20, 21, 22 obtained in the lower part of the shell 2, in a manner so as to stably couple the latter with the pronged connection 15.

Suitably, the central body 16 has a substantially constant cross section, as is clearly illustrated in FIG. 5, and has a slit or slotted through hole 23, preferably having flared or smoothed edges and which is extended in the longitudinal direction of the central body 16.

The fork connection 15 can be connected to the seat post 12 by means of a fork 24 formed by a pair of lateral wings 25, 26, having a distance between their inner surfaces sufficient to allow the insertion of the central body 16, as well as respective circular through openings 27, 28.

The maximum width T of the fork 24 is extremely reduced and is substantially equal to the maximum width of the central body 17 plus the thickness of the wings 25, 26, and the connection members with the fork connection 15, as is clearly visible in FIG. 5.

It is observed that the intermediate portion 5 of the shell 2 is sized in a manner such that its minimum width G is just greater than the maximum width T, in a manner so as to prevent any interference of the inner surface of the user's thighs with the connection means.

In order to lock the fork 24 with respect to the pronged connection 15, suitable locking means are provided for, generically indicated with 29 in FIGS. 1, 2, 4, 5.

Due to the conformation of the above-described connection means 11, it is possible to obtain a stable coupling of the shell 2 to the tubular seat post 12 with minimum bulk, which allows reducing the minimum width G of the intermediate portion 5 of the shell 2 to a minimum.

The connection means described above have the advantage of being particularly compact, with extremely reduced transverse size. Nevertheless, it is entirely evident that in place of the aforesaid connection means, other types could be used, so long as they are provided with reduced maximum transverse size T as previously illustrated.

For the sake of descriptive completeness, it is possible to provide for a cover and/or padding layer, of known type and not represented in the figures, associated with the upper surface of the shell 2.

With regard to that previously described, it is understood that the ergonomic saddle structure according to the finding attains all the pre-established objects, and in particular obtains the following advantages.

The mechanical rubbing of the inner thigh on the saddle is reduced, as is the heat produced from the rubbing; thus, all of the consequent pathologies are reduced: boil-like sores etc. A performance improvement is obtained by reducing the resistance produced by the thigh during the extension of the leg, and consequently, given the same produced speed, the physical effort is clearly lower. A correct sitting is allowed on the saddle without having to move forward or backward.

The saddle structure according to the finding is susceptible to numerous modifications and variants, all falling within the inventive concept expressed in the enclosed claims.

All the details can be substituted with other technically equivalent elements, and the materials can be different as needed, without departing from the scope of the finding.

Even if the saddle structure was described with particular reference to the enclosed figures, the reference numbers used in the description and in the claims are used for improving the comprehension of the finding, and do not constitute any limitation of the claimed protective scope.

The invention claimed is:

1. An ergonomic saddle structure comprising:
a shell (2) made of a relatively rigid material having a longitudinal axis (X) and a total length (L); and
a connection member (11) designed to anchor said shell (2) to a seat post (12) of a frame of a bicycle or pedal operated machine, said connection member (11) having a predetermined maximum width (T);
wherein said shell (2) comprises a rear portion (3) with an enlarged plan shape having predetermined length (L) and width (W) and convex lateral edges (6, 7), a front portion (4) with an at least partially tapered plan shape and a front edge portion (4'), and an intermediate connection portion (5) with concave lateral edges (13, 14) uniformly joined to the convex lateral edges (6, 7) of said rear portion (3),
wherein the convex lateral edges (6, 7) of said rear portion (3) have a substantially constant curvature and a predetermined average bend radius (M), and
wherein said intermediate portion (5) has a minimum width (G) just greater than the maximum width (T) of said connection member (11), the concave lateral edges (13, 14) of said intermediate portion (5) having a bend radius (R) about equal to the average bend radius (M) of said rear portion (3) and centers of curvature (C) placed at a distance (H) from said front edge portion (4') about equal to the distance of said minimum width (G) of said intermediate portion (5) from said front edge portion (4'), thereby defining a narrow zone (S) configured to reduce compression and rubbing of an inner thigh of a user of said ergonomic saddle structure with said concave lateral edges (13, 14), and to increase comfort and efficiency of a pedal stroke.

2. The ergonomic saddle structure as claimed in claim 1, wherein said bend radius (R) of the concave lateral edges (13, 14) of said intermediate portion (5) is comprised between 20% and 50% of the total length (L) of said shell (2).

3. The ergonomic saddle structure as claimed in claim 1, wherein said bend radius (R) of the concave lateral edges (13, 14) of said intermediate portion (5) is about 30% of said total length (L).

4. The ergonomic saddle structure as claimed in claim 1, wherein said minimum width (G) of said intermediate portion (5) is comprised between 20% and 30% of the width (W) of said shell (2).

5. The ergonomic saddle structure as claimed in claim 1, wherein said minimum width (G) of said intermediate portion (5) is about 25% of said width (W).

6. The ergonomic saddle structure as claimed in claim 1, wherein said minimum width (G) of said intermediate portion (5) is positioned at a distance (D) from the front edge portion (4') of the shell comprised between 30% and 50% of said total length (L).

7. The ergonomic saddle structure as claimed in claim 1, wherein said minimum width (G) of said intermediate portion (5) is positioned at a distance (D) from the front edge portion (4') of the shell about 40% of said total length (L).

8. The ergonomic saddle structure as claimed in claim 1, wherein said connection member (11) comprises a pronged connection (15) designed to be coupled to said shell (2) at said front portion (4) and said rear portion (3).

9. The ergonomic saddle structure as claimed in claim 8, wherein said pronged connection (15) comprises a substantially rectilinear central body (16) having a slit or slotted through hole (23) extending in a longitudinal direction of said rectilinear central body (16).

10. The ergonomic saddle structure as claimed in claim 9, wherein said slotted through hole (23) has flared or chamfered edges.

11. The ergonomic saddle structure as claimed in claim 9, wherein said rectilinear central body (16) of said pronged connection (15) comprises a front prong (17) and a pair of substantially symmetrical and upwardly directed rear prongs (18, 19).

12. The ergonomic saddle structure as claimed in claim 11, wherein said shell (2) has, in a lower part thereof, respective housings (20, 21, 22) for insertion of said front and rear prongs (17, 18, 19) so to achieve a stable coupling of said shell (2) with said pronged connection (15).

13. The ergonomic saddle structure as claimed in claim 9, wherein said seat post (12) comprises a connection fork (24) designed to be coupled to said pronged connection (15) at said central body (16) and having a maximum transverse dimension corresponding to said predetermined maximum width (T).

* * * * *